United States Patent [19]
Chang

[11] 3,826,136
[45] July 30, 1974

[54] ANEMOMETER DEVICE
[76] Inventor: Nai-Chong Chang, 6 Robbin Hill Rd., Scarsdale, N.Y.
[22] Filed: June 7, 1972
[21] Appl. No.: 260,398

[52] U.S. Cl. .................................. 73/189, 73/228
[51] Int. Cl. ............................................. G01p 5/04
[58] Field of Search ...... 73/186, 189, 228; 267/158, 267/160, 163

[56]  References Cited
UNITED STATES PATENTS
| | | | |
|---|---|---|---|
| 2,892,348 | 6/1959 | Ekstrom | 73/228 |
| 3,463,003 | 8/1969 | Pierman et al. | 73/189 |
| 3,564,917 | 2/1971 | Cronin et al. | 73/186 |
| 3,681,987 | 8/1972 | Ruskin | 73/186 X |

Primary Examiner—James J. Gill
Attorney, Agent, or Firm—R. R. Skolnick

[57] ABSTRACT

An anemometer device which utilizes a blade that is mounted within a case whereby it can rotate about a center which is pivotless. The case has holes therein for allowing air to enter and depart. The entering air moves the blade proportionately to the force the air is exerting against the blade, the force being the velocity of the air relative to the blade. The top of the case has markings corresponding to air speed and when the blade lines up with one of the markings the air speed can be determined. A maximum speed indicator moves with the blade but is biasedly attached to the case so that it remains at the maximum air speed indicated.

2 Claims, 5 Drawing Figures

PATENTED JUL 30 1974 3,826,136

ANEMOMETER DEVICE

BACKGROUND OF THE INVENTION

This invention relates in general to air speed indicating devices and more particularly to speed indicating devices for skiers.

Heretofore, the methods employed for measuring air speed have utilized blade arrangements which are spring biased. Some have utilized ratchet arrangements. All of the arrangements used create an additional factor of friction which has to be overcome thereby allowing errors to be part of the air speed indication. Examples of these arrangements are disclosed in Cronin et al. U.S. Pat. No. 3,564,917; Ekstrom, Jr., U.S. Pat. No. 2,892,348; Snider U.S. Pat. No. 2,889,707; Cramer U.S. Pat. No. 2,793,528 and Bull U.S. Pat. No. 2,075,424.

Additionally, the prior art devices are very complex in structure using many parts and arrangements to achieve their ends.

It is therefore an object of this invention to provide an improved anemometer device for use by skiers.

Another object of this invention is to provide an improved anemometer device which has an indicator for indicating maximum speed attained by skier.

A further object of this invention is to provide an anemometer device which employs a blade that rotates about a pivotless center.

A still further object of this invention is to provide an economical, maintenance free, compact, easily assembled anemometer device.

SUMMARY OF THE INVENTION

To these ends the invention contemplates the use of a case having an arcuate chamber therein. The sides of the case have holes therein allowing air to enter and depart from the arcuate chamber. The case is fastened on a skier's arm or leg or can be held in the skier's hand and as the skier moves down a slope the air enters the case and impinges against a blade.

The blade is positioned in said arcuate chamber whereby air entering one side of the case acts upon the blade forcing the blade to move in proportion to the force being exerted upon it. The blade is mounted within the case so that its movements do not have to overcome friction. This is accomplished by mounting the blade whereby it rotates about a pivotless center.

The roof of the arcuate chamber has a slot therein for allowing a portion of the blade to pass through. The top of the case is made of a clear material so that the blade portion extending through the arcuate chamber roof can be seen. The top of the case has markings thereon corresponding to different air speeds. The position of the blade relative to the markings indicates the speed of the skier.

An indicator arm is mounted within the case so as to be positioned directly behind the blade. This arm is mounted so as to specifically have a friction pivot. This is accomplished by spring loading the pivot or rotational point.

As the blade moves it pushes the indicator arm. The indicator arm because of its spring load will remain at the extreme end of its travel thereby allowing the skier to see the maximum speed attained by him during his downhill run. The indicator arm can be reset to zero by the skier at any time by means of a reset pin.

The indicator arm does not have to be used if the skier wishes more accuracy from the anemometer device. By not using the indicator arm the blae does not have to push against the additional spring load of the indicator arm.

This invention has other objects and advantages which will appear from the following description of a particular embodiment of the invention in conjunction with the accompanying drawings, in which:

DETAILED DESCRIPTION OF THE INVENTION

Figure 1:
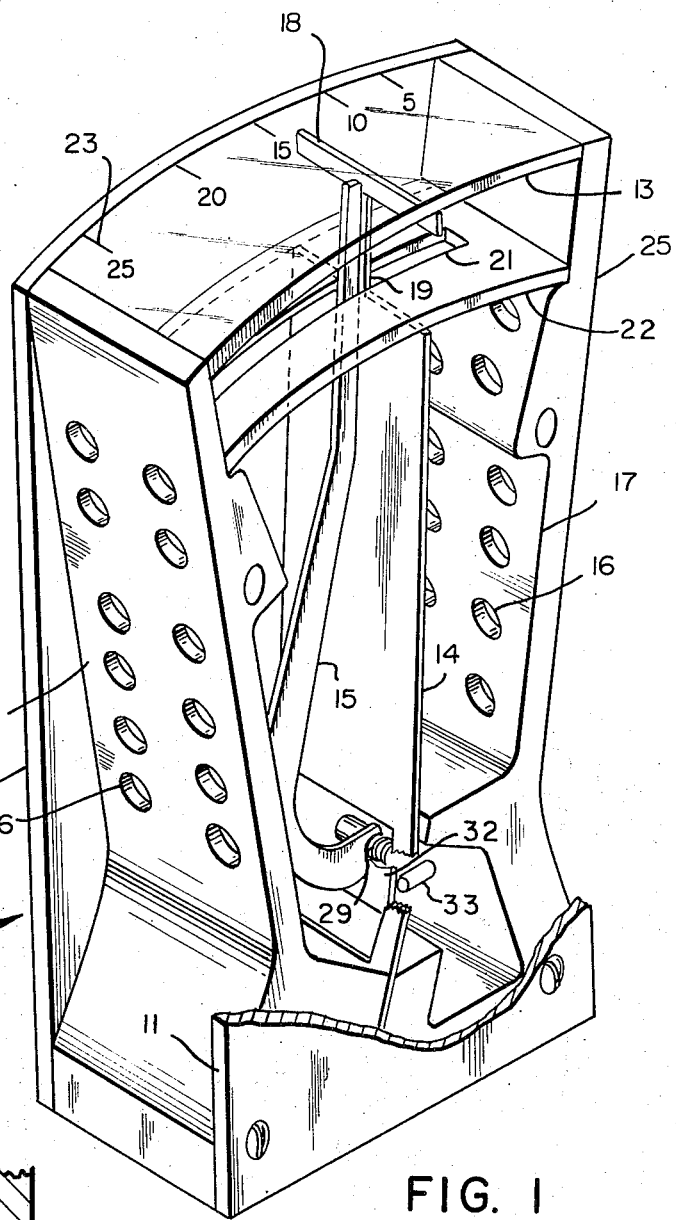
FIG. 1 is a perspective sectional view of the invention with part of the front cover removed.

With reference to FIG. 1 of the drawings, the particular embodiment shown there of the invention comprises, in general, a case 10, a front cover 11, a back cover 12, a scale window 13, a blade 14, and a maximum speed indicator arm 15.

The case 10 has two sides 25 and 26, the sides having a plurality of holes 16 therein. These holes allow air to enter an arcuate chamber 17 which is formed by the two sides, the back cover 12, the front cover 11, and a top cover 22. The air enters through one side of the case and leaves by the other side.

As the air enters the chamber 17 it impinges upon the blade 14, the blade being arcuately displaced in proportion to the force exerted by the air.

The top of the blade 14 is tee shaped 18 and the stem portion 19, of the tee, passes through a slot 21 which is in the top cover 22.

At the top of the case is a scale window 13 which has markings 23 thereon. These markings indicate the speed of the air surrounding the case 10, relative to the case.

Figure 3:
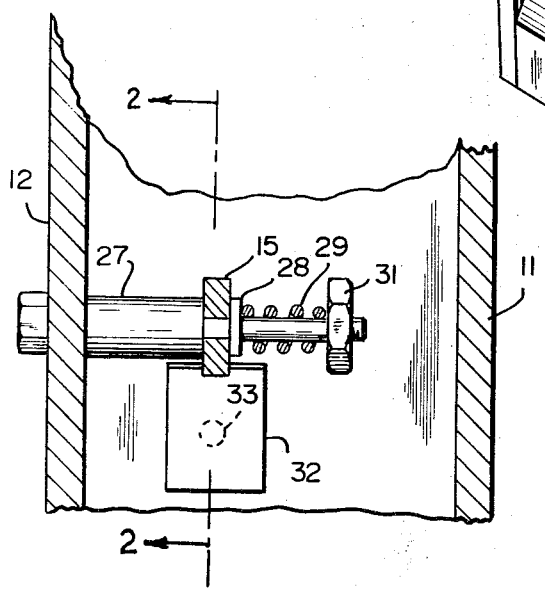
FIG. 3 is a sectional view of the spring loaded pivot for maximum speed indicator arm taken along line 3—3 of FIG. 2.

The bottom of the blade 14 is clamped between the bottom portions of the side 25 and 26. The blade has a rectangular portion cut out which serves two purposes. It allows the maximum speed indicator arm 15 to pass through it and also allows the blade to be extremely flexible as the cross sectional area of the blade at its point of rotation will be very small. As shown in FIG. 3, the maximum speed indicator arm 15 is rotatably mounted at the bottom of the case by means of a stud 27 which is fastened to the back cover 12. The arm is rotated by the blade 14 pushing against it. The arm maintains its position relative to the case by means of the rotational bias placed upon it by the friction of washer 28 pressing against it. The pressure of the washer depends upon the force exerted upon it by spring 29, the spring force being adjustable by a nut 31. The bottom of the maximum speed indicator arm 15 is flared out to form a flat surface 32.

Figure 2:
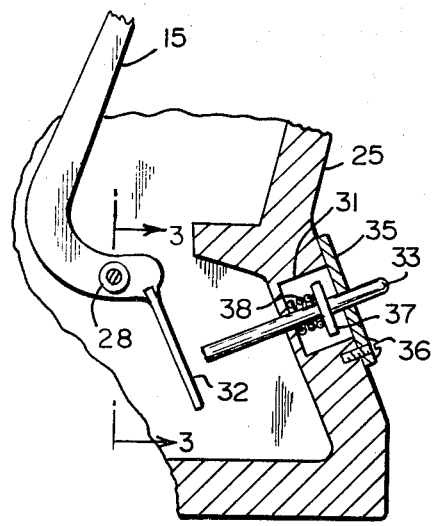
FIG. 2 is a sectional view of the reset pin taken along line 2—2 of FIG. 3.

To reset the maximum speed indicator arm 15 to a zero position, a reset pin 33 is utilized. As shown in FIG. 2, the reset pin 33 is captured within a recess 34 of the side 25 of the case by means of plate 35 which is screwed to side 25 by a screw 36. The reset pin has a shoulder 37. A spring 38 is positioned between shoulder 37 and the bottom of recess 34. The reset pin 33 is pushed against the flat surface 32 of the arm 15 so that the arm can be returned to its zero position. When the reset pin is released the pin returns to its original position by means of the spring 38 pushing against the shoulder 37 of the pin 33. In this particular embodiment a blade 41, which has an inverted U-shaped cutout at its mounting end, is mounted within a case 45. Case 45 is substantially the same as case 10. A side 44 of case 45 has a lip 43. The blade 41 is fastened to lip 43 by means of a screw 42 which holds down a tongue 46 which is within the inverted U cutout, to lip 43. This particular configuration allows the blade to rotate about a fixed axis and for small distances of blade travel the top of the blade will rotate about a circular path rather than a curvilinear path.

Figure 4:
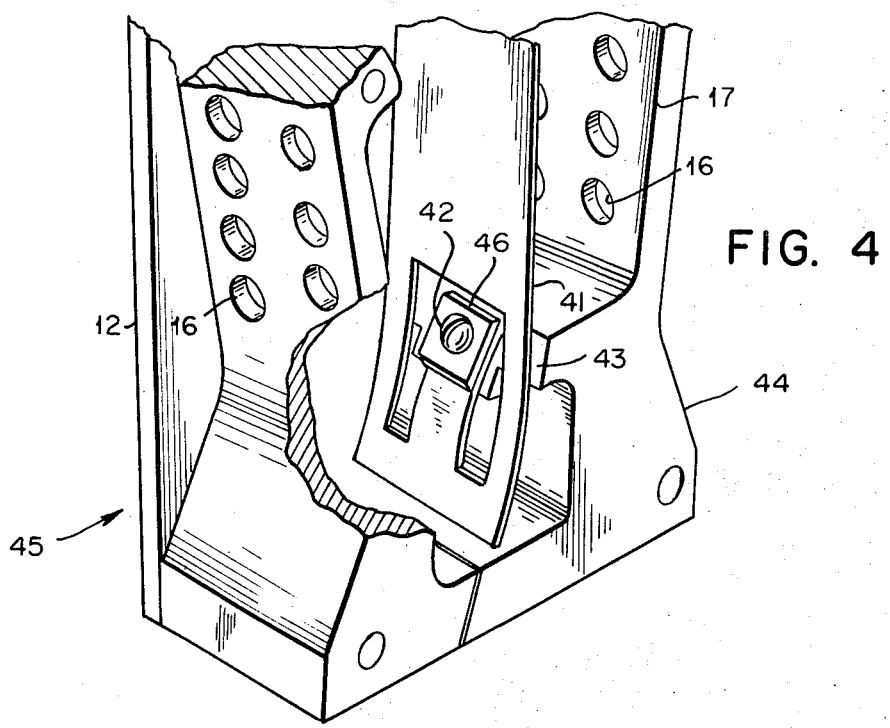
FIG. 4 is a partial perspective view of the invention showing an alternate blade arrangement.
Figure 5:
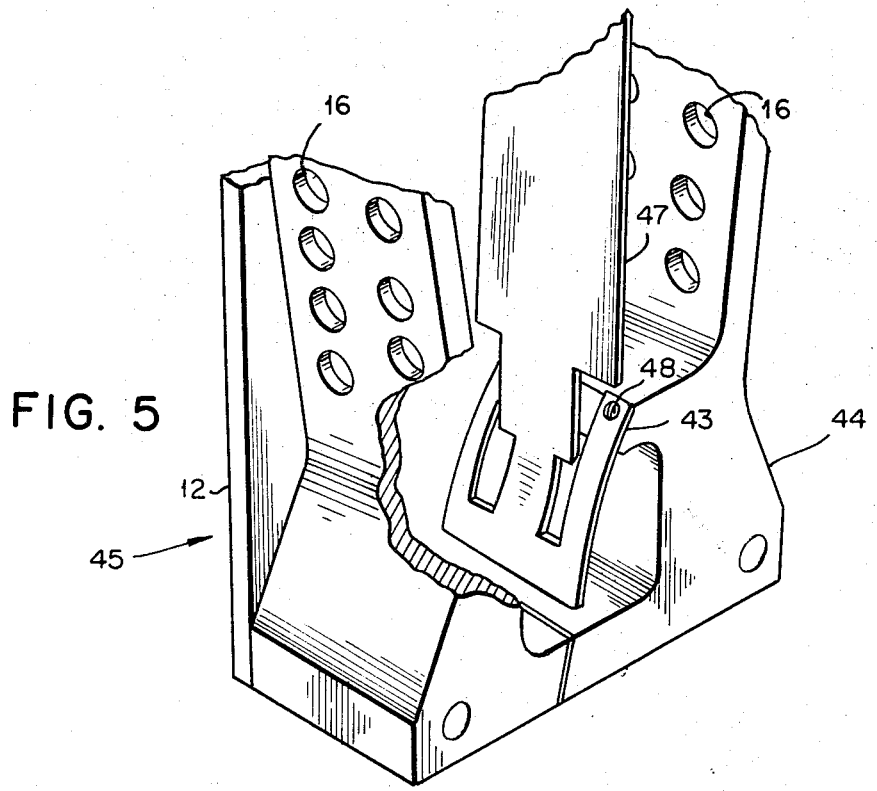
FIG. 5 is a partial perspective view of still another blade arrangement.

FIG. 5 shows another embodiment of the invention utilizing an E shaped blade 47. In this particular embodiment the outer legs of the blade are fastened to lip 43 of side 44 of the case 45 by means of two screws 48. The bottom of blade 48 is shaped like an E, the center of the E being elongated into a paddle of the blade. In this particular embodiment the paddle rotates in a similar manner as the one described above for FIG. 4.

The operation of the invention will now be more fully explained to indicate how the parts enumerated above operate together to perform a useful function in a new and novel manner.

The invention is either strapped to the hand or arm of a skier (the strap not being shown) or it could be strapped to a leg, the case being strapped so that the side 25 faces the direction in which the skier is going.

As the skier moves down the slope the speed of the skier is indicated by means of measuring the force of the air surrounding the skier, that is, the speed of the skier relative to the air around the skier.

The air enters the side 25 of case 10 through holes 16. The air pushes against blade 14 and the faster the skier goes the more the blade 14 is displaced. As blade 14 is displaced it pushes against arm 15, the arm remaining in its furthermost travel as it is held there by means of the bias placed upon its pivot point, the bias being placed thereon by spring 29.

The skier can see the speed he is attaining at any particular time as well as see the maximum speed he attained during his run.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. An anemometer comprising a case having two sides, a front, a back and a top, the sides, front, back and top forming an inner air chamber, one of said sides having a lip thereon, a blade having a slot at one end thereof, the slot of said blade being shaped as an inverted U, a tongue within the slot being fastened to said lip whereby for small distances of travel said blade rotation is circular and about a pivotless center having a fixed axis, a scale mounted on said case above said blade, and said sides having holes therein for allowing air to enter and exit from said air chamber whereby air entering said chamber arcuately displaces said blade, the position of the blade relative to said scale indicating the movement of the air relative to said case.

2. An anemometer comprising a case having two sides, a front, a back and a top, the sides, front, back and top forming an inner air chamber, one of said sides having a lip thereon, a blade having a slot at one end thereof, the slot of said blade being shaped as an E, the center leg of the E being elongated into a moveable paddle of the blade and the outer legs of the E being fastened to said lip whereby for small distances of travel said paddle rotation is circular and about a pivotless center having a fixed axis, a scale mounted on said case above said blade, and said sides having holes therein for allowing air to enter and exit from said air chamber whereby air entering said chamber arcuately displaces said blade, the position of the blade relative to said scale indicating the movement of the air relative to said case.

* * * * *